United States Patent
Johnson et al.

(10) Patent No.: US 11,603,247 B2
(45) Date of Patent: Mar. 14, 2023

(54) BIODEGRADABLE PACKAGING

(71) Applicant: PUMA SE, Herzogenaurach (DE)

(72) Inventors: Charles Johnson, Nuremberg (DE); Matthias Hartmann, Forchheim (DE)

(73) Assignee: PUMA SE, Herzogenaurach (DE)

( * ) Notice: Subject to any disclaimer, the term of this patent is extended or adjusted under 35 U.S.C. 154(b) by 769 days.

(21) Appl. No.: 16/378,367

(22) Filed: Apr. 8, 2019

(65) Prior Publication Data

US 2020/0317419 A1  Oct. 8, 2020

(51) Int. Cl.
*B65D 81/03* (2006.01)
*B65D 65/46* (2006.01)
*B65D 85/18* (2006.01)

(52) U.S. Cl.
CPC .......... *B65D 81/03* (2013.01); *B65D 65/466* (2013.01); *B65D 85/187* (2013.01); *Y02W 90/10* (2015.05)

(58) Field of Classification Search
CPC .... B65D 81/03; B65D 65/466; B65D 85/187; Y02W 90/10
See application file for complete search history.

(56) References Cited

U.S. PATENT DOCUMENTS

| | | | |
|---|---|---|---|
| 2,240,599 A * | 5/1941 | Amberg | B65D 3/08 |
| | | | 229/5.5 |
| 4,063,371 A | 12/1977 | Batra | |
| 4,092,221 A | 5/1978 | Schlichting, Jr. | |
| 6,376,213 B1 | 4/2002 | Oda et al. | |
| 8,741,597 B2 | 6/2014 | Orenga et al. | |
| 8,745,892 B2 | 6/2014 | Polegato Moretti | |
| 2003/0199095 A1 | 10/2003 | Yuyama et al. | |
| 2005/0031733 A1* | 2/2005 | Domingues | A21D 8/02 |
| | | | 426/19 |
| 2005/0204449 A1 | 9/2005 | Baron et al. | |
| 2006/0257908 A1 | 11/2006 | Rui et al. | |
| 2008/0053556 A1 | 3/2008 | Lin | |
| 2013/0130399 A1 | 5/2013 | Mills et al. | |
| 2013/0269592 A1 | 10/2013 | Heacock et al. | |
| 2014/0065311 A1 | 3/2014 | Moseley et al. | |
| 2015/0346513 A1 | 12/2015 | Heacock | |

(Continued)

FOREIGN PATENT DOCUMENTS

| | | | |
|---|---|---|---|
| JP | 08089284 A | 4/1996 | |
| JP | 09187431 A | 7/1997 | |

(Continued)

OTHER PUBLICATIONS

Nigam, P. S. (Aug. 23, 2013). Microbial enzymes with special characteristics for biotechnological applications. Biomolecules. Retrieved Feb. 1, 2022, from https://www.ncbi.nlm.nih.gov/pmc/articles/PMC4030947/ (Year: 2013).*

(Continued)

*Primary Examiner* — Rafael A Ortiz
*Assistant Examiner* — Sanjidul Islam
(74) *Attorney, Agent, or Firm* — Quarles & Brady LLP

(57) ABSTRACT

Packaging that includes a first layer of bubbles, wherein each of the bubbles comprises an outer shell that defines an interior cavity, and a first element and a second, different element provided within the interior cavity of at least one bubble. The at least one bubble is configured to inflate or degrade over time.

10 Claims, 8 Drawing Sheets

(56) References Cited

U.S. PATENT DOCUMENTS

| | | |
|---|---|---|
| 2015/0370320 A1 | 12/2015 | Connor |
| 2016/0135543 A1 | 5/2016 | Anceresi et al. |
| 2017/0027482 A1 | 2/2017 | Zilberstein et al. |
| 2017/0066583 A1 | 3/2017 | Kimbrough |
| 2017/0082573 A1 | 3/2017 | Vingerhoets et al. |
| 2017/0169692 A1 | 6/2017 | Parra et al. |
| 2017/0322163 A1 | 11/2017 | Heacock |
| 2018/0104017 A1 | 4/2018 | Heacock |
| 2019/0145849 A1 | 5/2019 | Jensen |
| 2019/0285577 A1 | 9/2019 | Swager et al. |
| 2020/0113287 A1 | 4/2020 | Johnson et al. |
| 2020/0156839 A1* | 5/2020 | Abramov ............... B65D 3/06 |

FOREIGN PATENT DOCUMENTS

| | | |
|---|---|---|
| JP | 2003007285 A | 1/2003 |
| JP | 2006214857 A | 8/2006 |
| WO | 2010006442 A1 | 1/2010 |
| WO | 2020074109 A1 | 4/2020 |

OTHER PUBLICATIONS

Jerry, D. C. T., Mohammed, T., & Mohammed, A. (2017). Yeast-generated CO2: A convenient source of carbon dioxide for Mosquito trapping using the BG-sentinel® traps. Asian Pacific Journal of Tropical Biomedicine. Retrieved Feb. 1, 2022, from https://www.sciencedirect.com/science/article/pii/S2 (Year: 2017).*

Anonymus: "Puma Biodesign: Breathing Shoes", , Apr. 17, 2018 (Apr. 17, 2018), Retrieved from the Internet: URL:https://vimeo.com/265128805 [retrieved on Jun. 15, 2020].

Anna Winston: "Puma and MIT Design Lab envision a future of selfadapting, per-media-lab-puma-future-s", May 24, 2018 (May 24, 2018), XP055594193, Retrieved from the Internet: URL:https://www.dezeen.com/2018/05/24/mit-media-ab-pumafuture-sportswear-design/ [retrieved on Jun. 5, 2019].

Shah Aamer Ali et al: "Microbial degradation of aliphatic and aliphatic-aromatic co-polyesters", Applied Microbiology and Biotechnology, Springer Berlin Heidelberg, Berlin/Heidelber vol. 98, No. 8, Feb. 13, 2014 (Feb. 13, 2014), pp. 3437-3447, X P035328980, ISSN: 0175-7598, DOI: 10.1007/S00253-014-5558-1 [retrieved on Feb. 13, 2014].

International Search Report and Written Opinion issued in corresponding International Application No. PCT/IB2020/053028, dated Jun. 29, 2020, 15 pages.

International Search Report and Written Opinion issued in corresponding International Application No. PCT/EP2018/077968, dated Jun. 13, 2019, 11 pages.

Shah et al., "Degradation of polyurethane by novel bacterial consortium isolated from soil," Annals of Microbiology, 58(3):381-386 (2008).

Yoshida et al., "A bacterium that degrades and assimilates poly-(ethylene terephalate)," Science, Mar. 11, 2016, 351(6278):1196-1199.

International Preliminary Report on Patentability (Form IPEA/409) of International Application No. PCT/EP2018/077968, dated Feb. 22, 2021, 19 pages.

International Search Report and Written Opinion of the International Searching Authority from corresponding PCT Application No. PCT/IB2020/053031, dated Aug. 28, 2020 (11 pages).

Hedge et al. "A comparative review of footwear-based wearable systems", Electronics, 2016, vol. 5, issue 3, 48 (Year: 2016).

Catenacci, T., "These new shoes designed by Puma and MIT Lab can tell how you're feeling", CNBC news article, published Jun. 6, 2018, https://www.cnbc.com/2018/06/05/puma-mit-shoes-can-breathe.htlml (Year: 2018).

Low, JH et al. "A pressure-redistributing insole using solft sensors and actuators", 2015 IEEE International Conference on Robotics and Automation (ICRA), 2015, pp. 2926-2930. (Year: 2015).

Office action from corresponding JP Application 2021-559709 dated Nov. 1, 2022 (7 pages).

* cited by examiner

BIODEGRADABLE PACKAGING

CROSS REFERENCE TO RELATED APPLICATIONS

Not applicable

REFERENCE REGARDING FEDERALLY SPONSORED RESEARCH OR DEVELOPMENT

Not applicable

SEQUENCE LISTING

Not applicable

BACKGROUND

1. Field of the Disclosure

The present disclosure relates generally to biologically programmable, biodegradable packaging that can be triggered to inflate to a specific shape and/or be controllably deformed over time, based on a profile of an article that is intended to be secured by the packaging. More specifically, the present disclosure relates to biodegradable packaging that includes live bacteria and media, which allows the packaging to degrade or deflate over time in a controlled manner.

2. Description of the Background

Packaging can be described as a coordinated system of preparing goods for transport, warehousing, logistics, sale, and/or end use. Generally, packaging contains, protects, preserves, transports, informs, and sells. Some types of packaging, and in particular bubble-type packaging, consists of a transparent plastic material that is used for packaging articles. The bubbles in the packaging provide cushioning for fragile or sensitive objects, and are generally available in different sizes, depending on a size of the article being packed, as well as a desired level of cushioning protection for the article. In some instances, multiple layers of bubble-type packaging may be needed to provide shock and vibration isolation. In many instances, bubble-type packaging is formed from polyethylene film, which may comprise low density polyethylene (LDPE), with a shaped side bonded to a flat side to form air bubbles. Some types of bubble wrap have a lower permeation barrier film to allow longer useful life and resistance to loss of air.

While the bubble portions of bubble-type packaging can come in a variety of sizes, the most common size of a bubble portion is one centimeter. In addition to the protection afforded to a carried article based on a size of air bubbles in the plastic, the plastic material itself can offer protection for the article being retained. For example, when shipping sensitive electronic parts and components, a type of bubble wrap can be used that employs an anti-static plastic that dissipates static charge. However, as with nearly all types of bubble-type packaging available to consumers and producers alike, which is typically made from polyethylene, the above-noted bubble-type packaging does not biodegrade quickly, and may take hundreds of years to do so. Further, the above-described bubble-type packaging typically includes rows and columns of bubbles that are the same size and same height, which can result in inefficient use of space when packaging an article since more packaging may be used than is necessary to secure an article. Still further, because bubble-type packaging having bubbles of the same size is typically utilized, additional inefficiencies result since voids or spaces may be formed where the bubbles are not of an adequate height or shape to fittingly secure the article within the bubble-type packaging.

In light of the above-noted deficiencies with currently-available bubble-type packaging, a need exists for a biologically programmable, biodegradable, and efficient type of packaging that can be used to store articles of varying sizes, including articles of clothing or footwear, electronics, or other types of industrial, commercial, or personal equipment.

SUMMARY

Biodegradable packaging, as described herein, may have various configurations, and is generally formed to be secured around a particular article based on an intended use of the biodegradable packaging. In some instances, the biodegradable packaging may be used to secure an article of footwear during packaging and transport thereof.

In some embodiments, packaging includes a first layer of bubbles, wherein each of the bubbles comprises an outer shell that defines an interior cavity, and a first element and a second, different element provided within the interior cavity of at least one bubble. The at least one bubble is configured to inflate or degrade over time. In some embodiments the first element is yeast. In some embodiments, the second element includes bacteria.

In some embodiments, the outer shell of the at least one bubble including the first element and the second element comprises a biodegradable material. In some embodiments, the first element is yeast and the second element is bacteria. In some embodiments, all of the bubbles of the first layer include the first element and the second element in their respective cavities. In some embodiments, the first element and the second element are not activated during a first state, and the first element and the second element are activated during a second state.

In some embodiments, packaging includes a first layer and a second layer of bubbles, wherein each of the bubbles comprises an outer shell that defines an interior cavity, the first layer and the second layer being connected along an outer edge. At least one bubble of the first layer of bubbles includes a first element and a second element within the interior cavity. At least one bubble of the second layer of bubbles includes the first element and the second element within the interior cavity, and wherein the at least one bubbles of the first and second layers are configured to inflate or degrade over time.

In some embodiments the first element is yeast. In some embodiments, the second element includes bacteria. In some embodiments, the outer shell of the at least one bubble including the first element and the second element in the first and second layers comprises a biodegradable material. In some embodiments, the first element is yeast and the second element is bacteria. In some embodiments, all of the bubbles of the first layer and second layer include the first element and the second element in their respective cavities. In some embodiments, a void is formed between the first layer of bubbles and the second layer of bubbles. In some embodiments, the void is configured to hold a pair of shoes. In some embodiments, the first plurality of bubbles are configured to inflate and the second plurality of bubbles are configured to deflate after being subjected to a stimulant.

In some embodiments, a method of preparing an article of footwear for transport in bubble-type packaging, comprising the steps of providing packaging that includes a first layer and a second layer of bubbles, wherein each of the bubbles comprises an outer shell that defines an interior cavity, wherein each of the first layer of bubbles and the second layer of bubbles includes a first element and a second element within the interior cavity of each bubble, and wherein the bubbles are configured to inflate or degrade over time, emitting a first stimulant upon the packaging to activate one or more of the first element and the second element, and placing the article within a void defined between the first layer and the second layer.

In some embodiments, the article includes a pair of shoes. In some embodiments, the first layer and the second layer have bubbles of a first size and bubbles of a second size, wherein the first size is greater than the second size. In some embodiments, the method further includes the step of securing the article by biologically programming the first element and the second element to cause the first layer of bubbles and the second layer of bubbles to snugly secure the article.

Other aspects of the biodegradable packaging, including features and advantages thereof, will become apparent to one of ordinary skill in the art upon examination of the figures and detailed description herein. Therefore, all such aspects of the article of footwear are intended to be included in the detailed description and this summary.

DETAILED DESCRIPTION OF THE DRAWINGS

Figure 1:
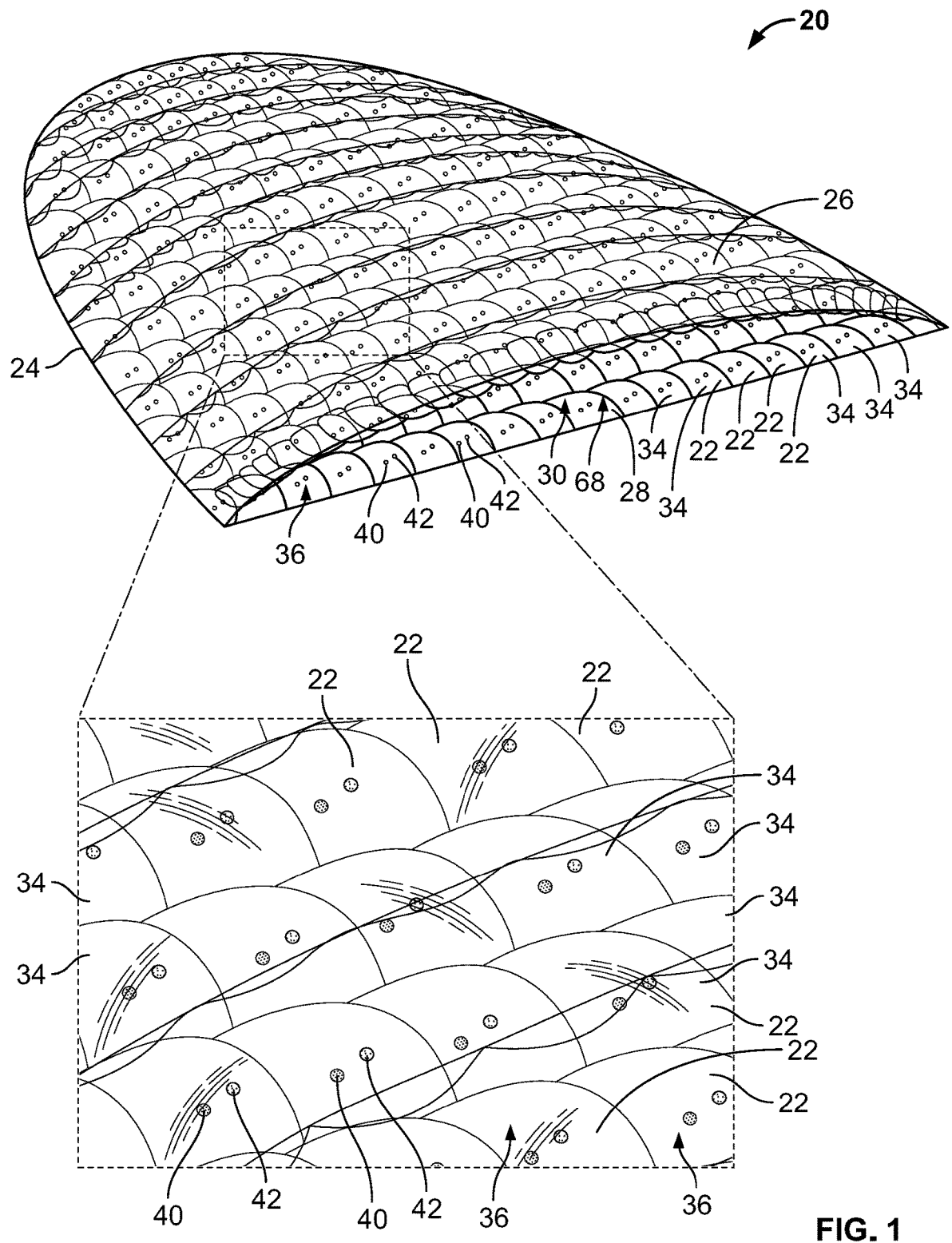
FIG. 1 is a front perspective and detail view of biodegradable packaging, which includes packaging bubbles, in accordance with the present disclosure.

The following discussion and accompanying figures disclose various embodiments or configurations of biodegradable packaging that are capable of securing or retaining a number of articles, including articles of clothing or articles of footwear. Although embodiments of biodegradable packaging are disclosed that are specific to packaging that secures one or more articles of footwear, concepts associated with embodiments of the biodegradable packaging may be used to secure a wide variety of articles, including clothing, electronics, toys, cosmetics, foodstuffs, automotive equipment, cleaning products, beverages, jewelry, office supplies, cook wear, sporting equipment, home goods, or any other type of consumer or industrial product that may be transported from one location to another. In addition to bubble-type packaging, particular concepts described herein may also be applied and incorporated in other types of packaging, including blister packs, vacuum packaging, boxes, or other types of packaging. Accordingly, concepts described herein may be utilized in a variety of products and in a variety of applications.

The term "about," as used herein, refers to variations in the numerical quantity that may occur, for example, through typical measuring and manufacturing procedures used for articles of packaging, or other articles of manufacture that may include embodiments of the disclosure herein, through inadvertent error in these procedures, through differences in the manufacture, source, or purity of the ingredients used to make the compositions or mixtures or carry out the methods, and the like. Throughout the disclosure, the terms "about" and "approximately" refer to a range of values ±5% of the numeric value that the term precedes.

The terms "inflate," "inflatable," and "inflation," as used herein, refer to a material, component of, or portion of an article, such as a portion of packaging for example, that is capable of expanding or contracting over time. Inflation of a material may be achieved by direct introduction of a stimulant or stimuli comprising a gas or a liquid, which includes, but is not limited to, air, $CO_2$, nitrogen, hydrogen, helium, water, a solution, or combinations thereof.

The terms "bioinflation," "bioinflatable," and "bioinflation," as used herein, refer to a material, which may comprise a composition, an article or portion thereof, or packaging or a portion thereof, which is capable of expanding and holding a gas that has been generated by a biologically active agent. Bioinflation of the material may be achieved by introducing a composition comprising a biologically active agent into the material, along the material, or into a cavity that is defined by the material. Following activation of the biologically active agent by a stimulant or multiple stimuli, the biologically active agent releases a gas to expand and inflate the material. For example, a biologically active agent used for bioinflation will metabolize a chosen carbon source to produce gas, such as $CO_2$, which will then inflate the material.

Inflation or bioinflation may be identified based on an increase in volume of the material, an increase in the tautness of the surface of the material, an increase in the surface area of the material, an increase in the volume of air, gas, or liquid inside of the material, or an increase in the partial pressure inside of the material.

The terms "degrade," "degradable," and "degradation," as used herein, refers to a material, component of, or portion of an article, such as a portion of packaging for example, that is capable of being decomposed chemically or biologically following activation by a given stimulant or stimuli that promotes decomposition at a rate more rapid than if the material were left to decompose without the stimulant, stimuli or active agent.

The terms "biodegrade," "biodegradable," and "biodegradation," as used herein, refer to a material, which may comprise a composition, an article or portion thereof, or packaging or a portion thereof, that is capable of being decomposed biologically following activation by a given biological stimulant or stimuli, or exposure to a biologically active agent that promotes decomposition at a rate more rapid than if the material were left to decompose without the biologically active stimulant.

Degradation or biodegradation may be identified based on an alteration in the properties of the polymer or material such as a reduction in molecular weight, loss of mechanical strength, loss of surface properties, breakdown of the material into fragments, change in the color of the material, change in the weight of the material, change in flexibility of the material, change in toughness of the material, or release of one or more small molecules from the polymer or material including, but not limited to, $CO_2$, $CH_4$, and $H_2O$.

Biologically active agents used in the biodegradation or bioinflation of materials, such as a portion of packaging for example, described herein may be, but are not limited to, microorganisms such as a bacteria, an actinobacteria, a proteobacteria, a bacteroidetes, a fungi, a yeast, an algae, or a protozoa. Suitable microorganisms for use in reacting with or consuming materials may be found, for example, in Yoshida et al. ("A bacterium that degrades and assimilates poly(ethylene terephthalate)," Science, 2016, 351(6278): 1196-1199), Pathak and Navneet ("Review on the current status of polymer degradation: a microbial approach," Bioresources and Bioprocessing, 2017, 4:15), Shah et al. ("Microbial degradation of aliphatic and aliphatic-aromatic co-polyesters," Appl Microbiol Biotechnol, 2014, 98:3437-3447), and Abdel-Motaal et al. ("Biodegradation of ploy (ε-caprolactone) (PCL) film and foam plastic by *Pseudozyma japonica* sp. nov., a novel cutinolytic ustilaginomycetous yeast species," 3 Biotech, 2014, 4:507-512).

The microorganism chosen as a biologically active agent for biodegradation may be matched to the material, compositions, or portion of the article, or article of packaging, designed to be biodegradable. For example, the microorganisms *Ideonella sakaiensis* may be used to degrade poly (ethylene terephthalate) (PET) plastic material. Additional suitable microorganisms and the corresponding material they are known to degrade are provided in Table 1 below.

The microorganism chosen as a biologically active agent for bioinflation may be matched to a material or composition that it is known to metabolize or degrade. The chosen microorganism may then be formatted in a composition with a first type of material it is known to metabolize or degrade, and introduced into a cavity or along an inner surface of the material. In some embodiments, the microorganism may be layered between two portions of the material in a sheet or void. It is contemplated that in all disclosed embodiments, the cavity could be replaced with a void, or layering of materials. The material comprising the packaging as discussed herein could be applied to a portion of an article, regardless of whether that portion is a discrete section or a separate component.

Further, it is contemplated in the present embodiments that the article is a form of packaging, including the entirety or a portion of the packaging, as well as the entirety or a portion of any component of that packaging. For ease of discussion, however, several of the embodiments herein will be described in connection with packaging, it being understood that all of these examples may be applicable to a larger number of articles or portions of articles. In some embodiments, the material may be a first material, and there may be a second material adjacent to the first material, which the biologically active agent is not known to degrade. Upon degradation of the first type of material by the biologically active agent, gas will be released to inflate the packaging. Because the biologically active agent cannot degrade the second type of material from which the packaging is made, the packaging will remain intact and inflated.

TABLE 1

Biologically active agents for biodegradation or bioinflation of a material.

| Microorganisms | Materials |
|---|---|
| *Ideonella sakaiensis*; *Ideonella sakaiensis* strain 201-F6; *Thermobifida alba* Est119; *T. cellulosilytica* DSM44535 | Poly(ethylene terephthalate) (PET) |
| *Pseudomonas putida* | Naphthalene |
| *Pseudomonas putida* | Polystyrene |
| *Pseudomonas putida*; *Comamonas acidovorans* TB-35; *Curvularia senegalensis*; *Fusarium solani*; *Aureobasidium pullulans*; *Cladosporium* sp.; *Trichoderma* DIA-T spp.; *Trichoderma* sp.; *Pestalotiopsis microspora* | Polyurethane |
| *Brevibacillus borstelensis*; *Comamonas acidovorans* TB-35; *Pseudomonas chlororaphis*; *P. aeruginosa*; *P. fluorescens*; *Rhodococcus erythropolis*; *R. rubber*; *R. rhodochrous*; *Staphylococcus cohnii*; *S. epidermidis*; *S. xylosus*; *Streptomyces badius*; *S. setonii*; *S. viridosporus*; *Bacillus amyloliquefaciens*; *B. brevis*; *B. cereus*; *B. circulans*; *B. circulans*; *B. halodenitrificans*; *B. mycoides*; *B. pumilus*; *B. sphaericus*; *B. thuringiensis*; *Arthrobacter paraffineus*; *A. viscosus*; *Acinetobacter baumannii*; *Microbacterium paraoxydans*; *Nocardia asteroids*; *Micrococcus luteus*; *M. lylae*; *Lysinibacillus xylanilyticus*; *Aspergillus niger*; *A. versicolor*; *A. flavus*; *Cladosporium cladosporioides*; *Fusarium redolens*; *Fusarium* spp. AF4; *Penicillium simplicissimum* YK; *P. simplicissimum*; *P. pinophilum*; *P. frequentans*; *Phanerochaete chrysosporium*; *Verticillium lecanii*; *Gliocladium virens*; *Mucor circinelloides*; *Acremonium Kiliense*; *Phanerochaete chrysosporium* | Polyethylene |
| *Pseudomonas fluorescens* B-22; *P. putida* AJ; *P. chlororaphis*; *Ochrobactrum* TD; *Aspergillus niger* | Polyvinyl chloride |
| *Pseudomonas lemoignei*; *Alcaligenes faecalis*; *Schlegelella thermodepolymerans*; *Aspergillus fumigatus*; *Penicillium* spp.; *Penicillium funiculosum*; *Ilyobacter delafieldii*; *B. thuringiensis*; *Alcaligenes faecalis* | Poly(3-hydroxybutyrate) (PHB) |
| *Clostridium botulinum*; *C. acetobutylicum*; *Streptomyces* sp. SNG9; *B. thuringiensis* | Poly(3-hydroxybutyrate-co-3-hydroxyvalerate) (PHBV) |
| *Bacillus brevis*; *Clostridium botulinum*; *C. acetobutylicum*; *Amycolatopsis* sp.; *Fusarium solani*; *Aspergillus flavus*; *Pseudozyma japonica* Y7-09; *R. depolymerans* strain TB-87; *Leptothrix* sp. strain TB-71; *P. antarctica* JCM 10317; *Cryptococcus* sp. strain S2; | Polycaprolactone (PCL) |
| *Penicillium roquefort*; *Amycolatopsis* sp.; *Bacillus brevis*; *Rhizopus delemar* | Polylactic acid |
| *R. depolymerans* strain TB-87; *Leptothrix* sp. strain TB-71; | Poly(ethylene succinate) (PES) |
| *Streptomyces coelicolor* 1A; *Pseudomonas* | Poly(cis-1,4-isoprene) |

TABLE 1-continued

Biologically active agents for biodegradation or bioinflation of a material.

| Microorganisms | Materials |
|---|---|
| *citronellolis* | |
| *R. depolymerans* strain TB-87; *P. antarctica* JCM 10317; *A. oryzae* RIB40 | Poly(butylene succinate) (PBS) |
| *R. depolymerans* strain TB-87; *Leptothrix* sp. strain TB-71; *P. antarctica* JCM 10317 | Poly(butylene succinate-co-adipate) (PBSA) |
| *Leptothrix* sp. strain TB-71; *P. antarctica* JCM 10317; *Cryptococcus* sp. strain S2; *Paenebacillus amylolyticus;* | Poly(L-lactic acid) (PLA) |
| *R. depolymerans* strain TB-87; *Leptothrix* sp. strain TB-71; | Poly(butylene adipate-co-terephthalate) (PBAT) |
| *R. depolymerans* strain TB-87; *Leptothrix* sp. strain TB-71; | Poly(butylene succinate-co-terephthalate) (PBST) |
| *R. depolymerans* strain TB-87; *Leptothrix* sp. strain TB-71; | Poly(butylene succinate/ terephthalate/ isophthalate-co-lactate) (PBSTIL) |
| *T. fusca; T. lanuginosus;* | Poly(trimethylene terephthalate) (PTT) |
| *P. lemoignei* | Polyhydroxyvalerate (PHV) |
| *P. fluorescens* | Polyhydroxyoctanoate (PHO) |

In some embodiments, biologically active agents used in the biodegradation or bioinflation of materials described herein may be a recombinant microorganism genetically engineered to express one or more metabolic enzymes from a microorganism known to be active in the biodegradation of the material. For example, the biologically active agent may be a microorganism genetically engineered to express poly (ethylene terephthalate), hydrolase (Genbank accession number GAP38373.1), mono(2-hydroxyethyl)terephthalic acid hydrolase (Genbank accession number GAP38911.1), terephthalic acid-1,2-dioxygenase, 1,2-dihydroxy-3,5-cyclohexadiene-1,4-dicarboxylate dehydrogenase, PCA 3,4-dioxygenase, or combinations thereof, from *Ideonella sakaiensis*. Metabolic enzymes or other genes of interest for use in genetically engineering a recombinant microorganism for use as a biologically active agent may include, but are not limited to, esterases, lipases, proteases, PHA depolymerases, cutinases, monooxygenases, dioxygenases, hydrolases, dehydrogenases, carrinoid-dependent enzymes, and alginate-producing genes to enhance biofilm formation (e.g., algC).

The biologically active agents used in the materials described herein may be contained in or delivered to the article of packaging in any medium suitable for survival and growth of the biologically active agents. The medium may be in any form including, but not limited to, a gel, a hydrogel, a liquid, a cream, an oil, a foam, a paste, a powder, or a film. Components of the medium may include, but are not limited to, agar, agarose, peptone, polypeptone, glucose, yeast extract, malt extract, polyethylene glycol, salts (e.g., sodium hydrogen carbonate (NaHCO$_3$), ammonium sulfate ((NH$_4$)$_2$SO$_4$), calcium carbonate (CaCO$_3$), magnesium sulfate (MgSO$_4$), and sodium chloride (NaCl)), buffers (e.g., phosphate buffer, Tris buffer, sodium acetate buffer, and citrate buffer), vitamins (e.g., thiamine, niacin, aminobenzoic acid, pyridoxal-HCl, panthothenate, biotin, and vitamin B12), trace elements, water, solvents (e.g., methanol and ethanol), or combinations thereof. The pH of the medium may be adjusted to support the growth and survival of the biologically active agent. For example, the pH may be, but is not limited to, 2.0, 2.5, 3.0, 3.5, 4.0, 4.5, 5.0, 5.5, 6.0, 6.5, 7.0, 7.5, 8.0, 8.5, 9.0, 9.5, 10.0, 10.5, or 11.0. The medium may also include a low-crystallinity or low-density polymer such as, but not limited to, low-density polyethylene (LDPE), low-crystallinity PET film, low molecular weight polycaprolactine film, p-nitrophenyl butyrate, and p-nitrophenyl palmitate. In some embodiments, the medium includes a low-crystallinity (e.g., 1.9%) PET film to support the survival and growth of the microorganism selected as the biologically active agent.

One or more additives may be added to the medium or the material to tune the degradability, biodegradability, inflation, or bioinflation of the material. Additives may include, but are not limited to, benzophenone, polyhydroxyalkanoate (PHA) polyesters, or additional additives. In some embodiments, the additive may be one or more inhibitors to inhibit the degradation or biodegradation of the material. The inhibitor may be formulated in the medium containing the biologically active agents or may be printed on the interior surface of the material to inhibit degradation or biodegradation spatially around the surface of the material.

Additionally, the polymer material to be used in an article, such as a portion of packaging, may include an organic filler such as, but not limited to, eggshell, coconut, abaca, kenaf, seaweed, rice straw, sisal, coffee husk, corn stover, wood shavings, and sawdust. The inclusion of one or more organic fillers in the polymer material may enhance the degradation, biodegradation, or inflation or may allow for the tuning of the timing and degree of degradation, biodegradation, or inflation.

In some embodiments, the biologically active agent may be introduced into an article, such as a portion of packaging, as a biofilm. As used herein, the term "biofilm" refers to a film-like layer of bacteria or fungi formed by assembly of a matrix of extracellular polymeric substances, which promote cell-to-cell adhesion of bacteria or fungi. The biofilm promotes cell adsorption onto a surface, such as the surface of a polymer or material to be degraded. The biofilm may be introduced into the article of packaging on its own or it may be introduced with a medium that promotes the growth and survival of the bacteria or fungi as well as maintenance of the biofilm. In some embodiments, one or more dyes may be added to the biofilm to visualize biofilm formation and growth or to color the biofilm for use in the packaging.

Optionally, the medium containing the biologically active microorganism may be embedded as part of a nano-filler into the polymer material of the article of packaging. Stimuli used to prompt or accelerate degradation, biodegradation, inflation, or bioinflation may include, but are not limited to, variations in temperature, heat, cold, sweat, moisture, light, UV light, a change in pressure, a change in humidity, a change in pH, water, or a solvent. The stimuli may prompt or accelerate degradation, biodegradation, inflation, or bioinflation after a single exposure by one or more stimuli, or the degradation, biodegradation, inflation, or bioinflation may be tuned to respond after repeated exposure to the one or more stimuli. The stimuli may be or include an environmental stimulant such as exposure to one or more natural elements including humidity or pressure, and the degradation, biodegradation, inflation, or bioinflation may be tuned to respond to an environmental stimulant after a particular threshold is reached or period of time has elapsed. Exposure to the stimuli may cause a change in color, shape, form, or texture in reaction thereto. The biologically active agent selected for use has one or more beneficial properties that make it responsive to the stimulant or stimuli in the environment.

A stimulant or stimuli may be used to prompt, accelerate, or decelerate degradation. For example, in some aspects, the stimuli used to prompt or accelerate degradation or biodegradation may include, but are not limited to, variations in temperature (such as increases or decreases in heat), light, UV light, a change in pressure, a change in humidity, a change in pH, exposure to a liquid (e.g., water, salt water, an acidic solution, a basic solution), exposure to a gas (e.g., $CO_2$, $NH_3$, $NO_2$, $O_2$), or a solvent.

In yet another aspect, the stimulant or stimuli may include a variation in temperature and the degradation, biodegradation, inflation, or bioinflation may be tuned to respond to the temperature or change in temperature after a particular threshold is reached or a period of time has elapsed. The stimulant may be light of a given wavelength, such as UV light, visible light, or infrared radiation, or it may be a broad spectrum of light, and the degradation, biodegradation, inflation, or bioinflation may be tuned to respond to the light after a particular threshold is reached or a period of time has elapsed.

In some embodiments, degradation, biodegradation, inflation, or bioinflation is activated at temperature between about 30° C. and about 85° C., e.g., about 25° C., about 30° C., about 35° C., about 40° C., about 45° C., about 50° C., about 55° C., about 60° C., about 65° C., about 70° C., about 75° C., about 80° C. or about 85° C. In some embodiments, degradation, biodegradation, inflation, or bioinflation is activated at a humidity between about 20% relative humidity and about 100% relative humidity, e.g., about 20%, about 25%, about 30%, about 35%, about 40%, about 45%, about 50%, about 55%, about 60%, about 65%, about 70%, about 75%, about 80%, about 85%, about 90%, about 95%, or about 100%). In some embodiments, the degradation, biodegradation, inflation, or bioinflation is less active or completely inactivated at temperatures below about 30° C., below about 25° C., below about 20° C., below about 15° C., below about 10° C., below about 5° C., or below about 0° C. In some embodiments, the degradation, biodegradation, inflation, or bioinflation is less active or completely inactivated at a humidity below about 20%, below about 15%, below about 10%, below about 5%, or below about 2%.

The timing and duration of the degradation, biodegradation, inflation, or bioinflation of the material may be tuned or controlled. In some aspects, the timing and duration of the degradation or biodegradation of a material may be tuned or controlled based on a predetermined rate of biodegradation. For instance, a portion of packaging may be tuned to biodegrade after a predetermined amount of time, e.g., after 12 hours, after 24 hours, after 2 days, after 3 days, after 4 days, after 5 days, after 6 days, after a week, after two weeks, after three weeks, after four weeks, after a month, after 2 months, after 3 months, after 6 months, after a year, etc. Still further, as will be further discussed herein, a portion of packaging may change in appearance, e.g., color, shape, texture, etc., after a predetermined time of use and, thereby, provide an appearance that is different in a first state than in a second state. In some embodiments, the material is configured to entirely degrade after two months, after four months, after six months, after eight months, after one year, after 1.5 years, after 2 years, after 3 years, after 4 years, after 5 years, etc.

In further aspects, the timing and duration of the degradation or biodegradation of a material may be tuned or controlled based on a predetermined rate of biodegradation. For instance, a portion of packaging may include a component thereof that is tuned to biodegrade after a predetermined time, e.g., after about 12 hours, after about 24 hours, after about 2 days, after about 3 days, after about 4 days, after about 5 days, after about 6 days, after about a week, after about two weeks, after about three weeks, after about four weeks, after about a month, after about 2 months, after about 3 months, after about 6 months, after about a year, etc. In particular embodiments, a portion of packaging may include a component thereof that is tuned to biodegrade after a predetermined time and, resultantly, the packaging may indicate to a user how long the packaging has been securing the article held therein. In one particular aspect, a portion of packaging may be tuned to biodegrade after a predetermined time between about 1 week and about a month, or between about one month and about two months, or between about two months and about three months, or between about three months and about four months, or more.

In even further aspects, the timing and duration of the degradation or biodegradation of the material may be tuned or controlled so that biodegradation is only possible for a predetermined amount of time. For instance, a portion of packaging may include a component thereof that is tuned to biodegrade for only a predetermined amount of time, e.g., after about 12 hours, after about 24 hours, after about 2 days, after about 3 days, after about 4 days, after about 5 days, after about 6 days, after about a week, after about two weeks, after about three weeks, after about four weeks, after about a month, after about 2 months, after about 3 months, after about 6 months, after about a year, etc., and then cease to biodegrade thereafter. For example, a portion of packaging may include a biodegradable portion and/or material layer having a biologically active microorganism with a lifetime of a predetermined length, e.g., a week, a month, a year, etc., which allows the biodegradable portion to biodegrade for that predetermined length of time, but cease to biodegrade thereafter. As such, the biodegradable portion of packaging may provide an indication as to the extent of degradation during that predetermined length of time.

In still further aspects, the timing and duration of the degradation or biodegradation of a material may be tuned or controlled so that it provides an indication of environmental exposure of the packaging to a user. For example, as discussed herein, the degradation or biodegradation of a portion of packaging may be prompted or accelerated based on environmental factors, including, but not limited to variations in temperature, light, UV light, a change in pressure, a change in humidity, a change in pH, exposure to a liquid, e.g., water, salt water, an acidic solution, a basic solution, and/or exposure to a gas, e.g., $CO_2$, $NH_3$, $O_2$. Therefore, according to one aspect of the present disclosure, a portion of packaging may degrade or biodegrade after a certain amount of exposure to $CO_2$, for example, and/or may degrade or biodegrade when there are heightened amounts of $CO_2$ in the atmosphere.

Referring to FIG. 1, biodegradable packaging 20 is shown, which includes a plurality of packaging bubbles 22 (shown in the detail portion of FIG. 1), in accordance with the present disclosure. The packaging 20 includes a plurality of the packaging bubbles 22, which are disposed in columns and rows. In the present embodiment, the packaging 20 has an outer edge 24 that comprises a parabola or U-shape. The packaging 20 further includes a first or top layer 26 and a second or bottom layer 28 that are joined adjacent the outer edge 24. In some embodiments, only the first layer 26 is provided. The top layer 26 is also in the general shape of a U or parabola, and the bottom layer 28 is in the shape of a U or parabola. The packaging bubbles 22 are disposed along both the top layer 26 and the bottom layer 28, and are generally disposed adjacent to one another throughout the top layer 26 and the bottom layer 28. A void 30 is created between the top layer 26 and the bottom layer 28, wherein an article (see FIG. 4) may be placed into the void 30 for transport and/or storage of the article. The packaging bubbles 22 are also generally airtight, and do not allow air to enter into, or escape therefrom, unless the packaging bubbles 22 are being degraded by a biologic element, as discussed hereinafter below. For example, in some embodiments, a biological agent may degrade some of the packaging bubbles 22, which may allow the air held therein to escape through one or more apertures. While the packaging bubbles 22 generally appear to be similar in shape and configuration to one another, as discussed in greater detail below, the packaging bubbles 22 may have varying programmable biodegradable aspects, which may be determined before the packaging 20 is initially formed.

Still referring to FIG. 1, a detail view of the packaging bubbles 22 is shown. Each of the packaging bubbles 22 includes an outer shell 34, which is generally rounded, and may be uniform amongst the packaging bubbles 22 in a first state. The outer shell 34 defines an interior cavity 36 for each of the packaging bubbles 22. As noted above, the interior cavity 36 is generally air tight, and does not let air enter into or escape therefrom. In some embodiments, the cavities 36 are connected to one another via channels 38 (see FIGS. 2C and 2D). Each of the packaging bubbles further includes a first element 40 and a second element 42 disposed within the interior cavity 36. While the first element 40 and the second element 42 are visible in the present embodiment, the first element 40 and the second element 42 may not be visible to the naked eye in some embodiments. It should be noted that the terms "first element" and "second element" are used herein to refer to individual compounds, additives, biologically active agents, discrete components, distinct microorganisms, organic fillers, ingredients, combinations of ingredients, or modules.

In some embodiments, the interior cavities 36 of the packaging bubbles 22 are interconnected with one another by channels 38 that may be disposed between the interior cavities 36. In some embodiments, a semi-permeable membrane may be provided between the cavities 36 within the channels 38.

In some embodiments, the first element 40 comprises yeast, and the second element 42 comprises bacteria, which may be a genetically modified bacteria. The yeast of the first element 40 may be used to produce $CO_2$ within the interior cavity 36 of the packaging bubbles 22, which may cause the packaging bubbles 22 to inflate over time. The bacteria of the second element 42 may cause the packaging bubbles 22 to deflate over time. Each of the bubbles 22 may have a different concentration of the first element 40 and/or the second element 42, which may cause the bubbles 22 to contract or expand at different rates or to different extents, over time. Further, the first element 40 is not limited to yeast, and the second element 42 is not limited to bacteria. Still further, the packaging bubbles 22 may comprise only one of the first element 40 or the second element 42, or may further include additional, different elements. In fact, the first element 40 and/or the second element 42 may include any of the biologically active agents and/or active agent materials noted herein. In some embodiments, varying levels of the first element 40 and the second element 42 are included.

Figure 2A:
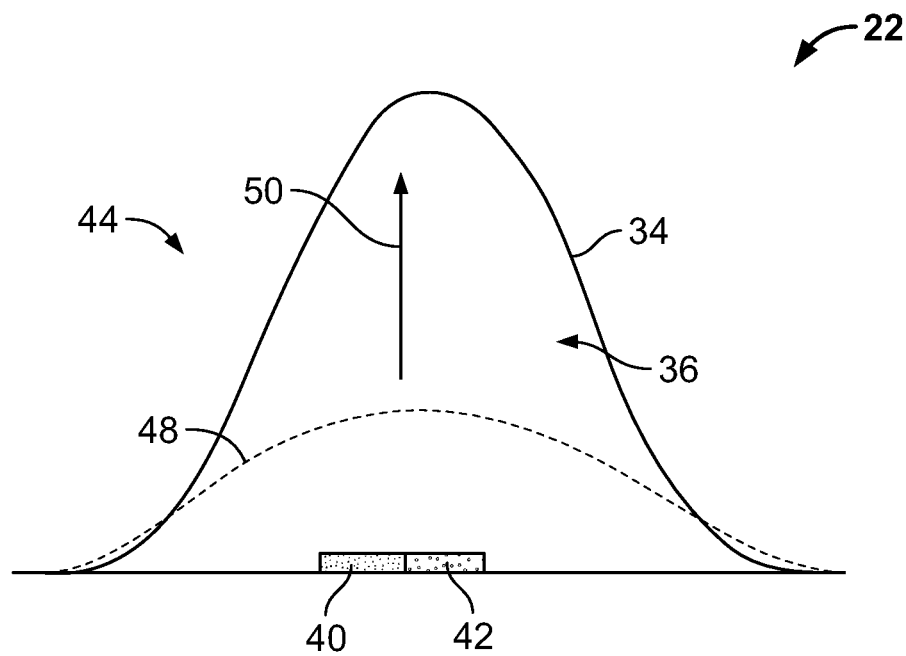
FIG. 2A is a side schematic view of a packaging bubble, similar to the packaging bubbles of FIG. 1, in a first state.
Figure 2B:
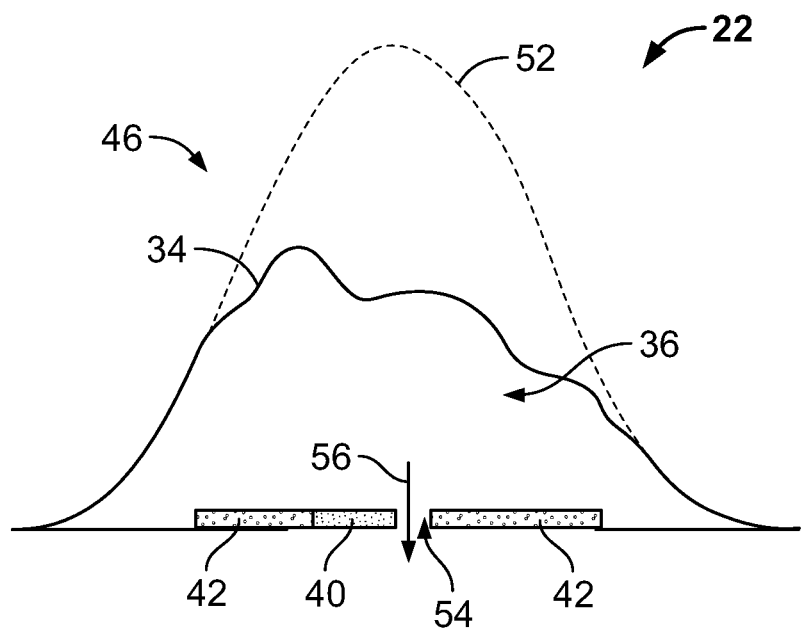
FIG. 2B is a side elevation schematic view of another packaging bubble, similar to the packaging bubbles of FIG. 1, in a second state.

Referring now to FIGS. 2A and 2B, the figures illustrate side schematic views of a first packaging bubble 44 and a second packaging bubble 46, respectively, which are similar to the packaging bubbles 22 of FIG. 1. In FIG. 2A, the first packaging bubble 44 is shown in an expanding state, and in FIG. 2B, the second packaging bubble 46 is shown in a deflating state. Referring specifically to FIG. 2A, the first packaging bubble 44 is shown in an expanding state, with a first phantom line 48 indicating an initial location or state of the outer shell 34 before the first packaging bubble 44 has begun undergoing expansion. The first element 40 and the second element 42 are also disposed within the interior cavity 36 of the first packaging bubble 44. As noted above, the first element 40 may include yeast, which may produce $CO_2$ and can cause the first packaging bubble 44 to expand. The production of $CO_2$ increases a volume of the gas within the interior cavity 36, which could cause the outer shell 34 of the first packaging bubble 44 to expand upward, in the direction of first arrow 50. As noted above, the first element 40 and the second element 42 may be biologically programmed to adjust the size of the first packaging bubble 44 based on one or more factors or considerations, as listed above.

Figure 2C:
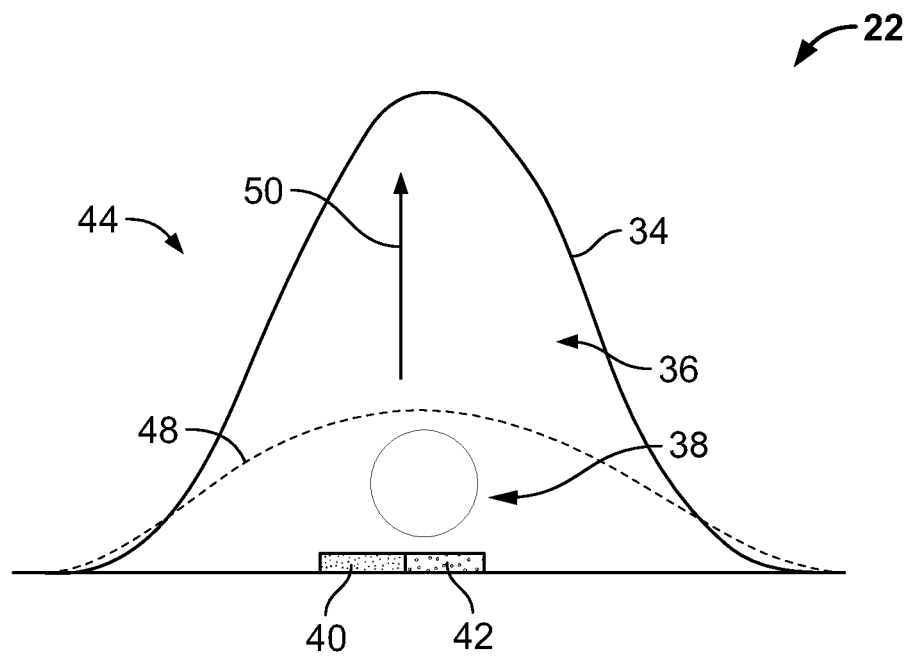
FIG. 2C is a side schematic view of another embodiment of a packaging bubble in a first state.
Figure 2D:
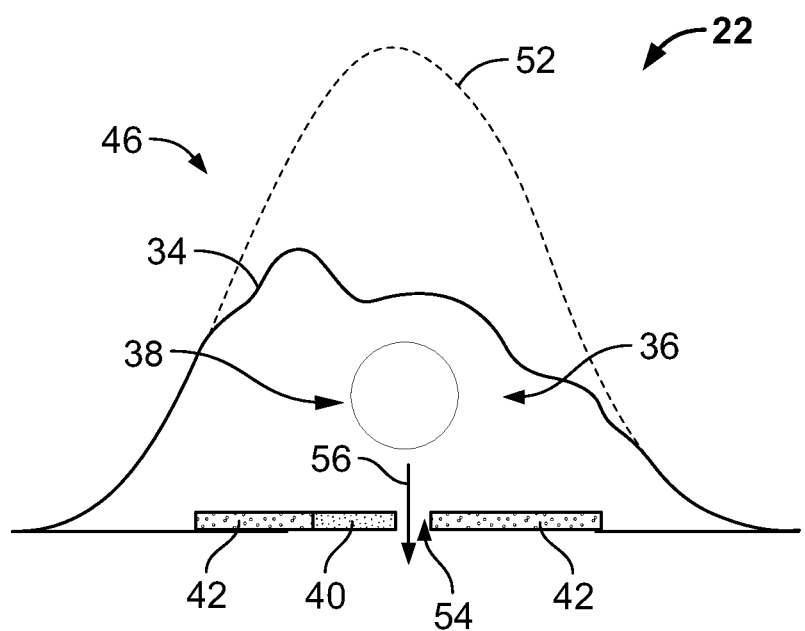
FIG. 2D is a side elevation schematic view of still another embodiment of a packaging bubble in a second state.
Figure 2E:
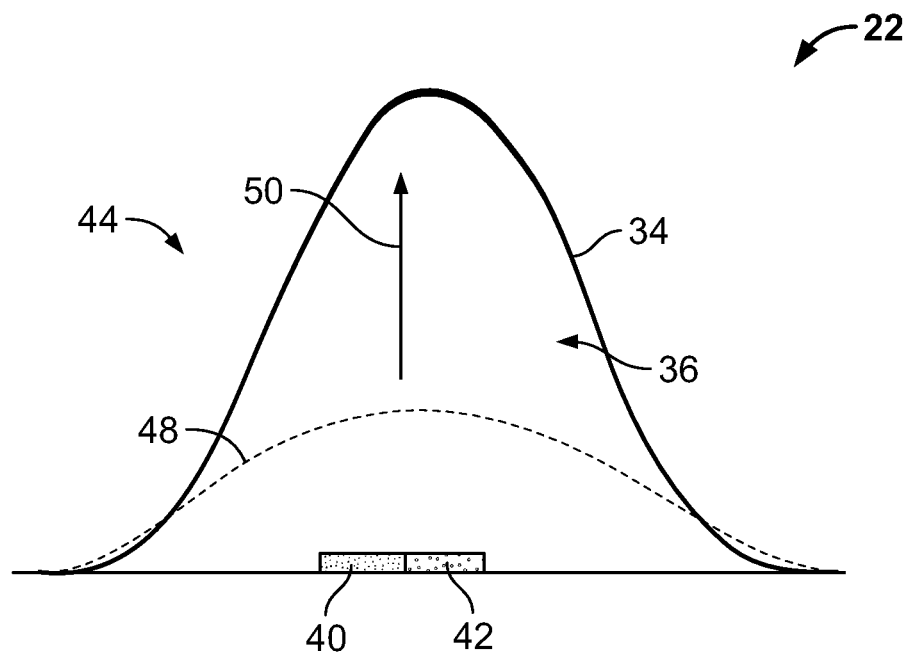
FIG. 2E is a side schematic view of yet another embodiment of a packaging bubble having a thicker outer shell than the embodiments of FIGS. 2A, 2B, 2C, and 2D, in a first state.
Figure 2F:
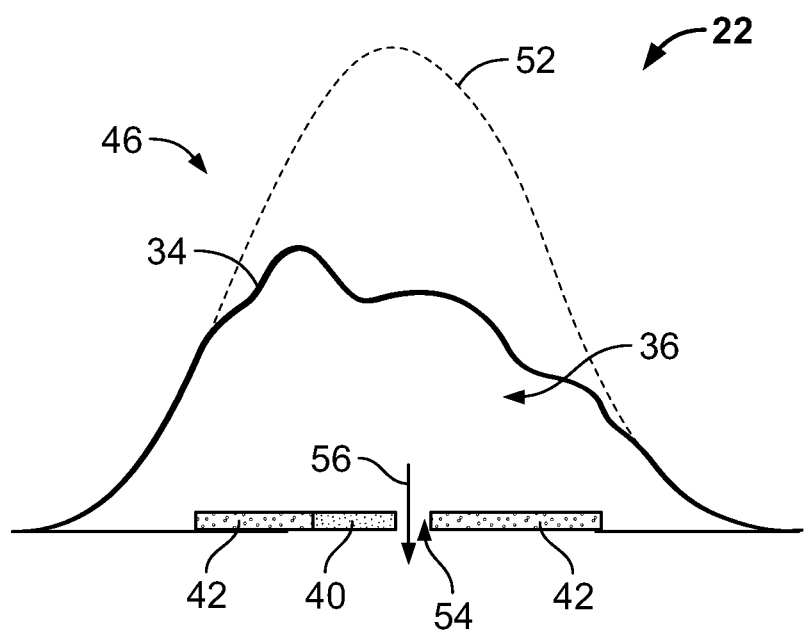
FIG. 2F is a side elevation schematic view of another embodiment of a packaging bubble having a thicker outer shell than the embodiments of FIGS. 2A, 2B, 2C, and 2D, in a second state.

Referring specifically to FIG. 2B, the second packaging bubble 46 is shown in a deflating state, with a second phantom line 52 indicating an initial location or state of the outer shell 34 before the second packaging bubble 46 has begun undergoing deformation. The first element 40 and the second element 42 are also disposed within the interior cavity 36 of the second packaging bubble 46. As noted above, the second element 42 may include bacteria, which may cause the second packaging bubble 46 to deflate over time by degrading the material comprising the outer shell 34 of the second packaging bubble 46. More specifically, the bacteria may cause an aperture 54 to form within the outer shell 34 of the second packaging bubble 46, and air may escape the bubble 46 in the direction of a second arrow 56. As noted above, one or more factors may contribute to a rate or length of time that degradation occurs, such as external factors or an intended life cycle of the bacteria. Still further, the packaging 20 may have properties that allow the bacteria to degrade the packaging over a first period of time, and the packaging may cease to degrade during a second period of time. Additional, varying embodiments of the first packaging bubble 46 and the second packaging bubble 48 are shown in FIGS. 2C and 2E, and 2D and 2F, respectively. More specifically, channels 38 are shown in the embodiments of FIGS. 2C and 2D, which may allow the bubbles 22 to be fluidly connected to one another, and a thicker outer shell 34 is shown in the embodiments of FIGS. 2E and 2F.

While the first packaging bubble 44 and the second packaging bubble 46 are shown in an expansion state and a deflating state, respectively, it should be understood that more complex expansion or deflation techniques may be implemented, such that the packaging bubbles 22 may undergo expansion or deflation at different times for a variety of reasons. For example, in some instances, some of the packaging bubbles 22 may expand for a pre-set period of time, and then such packaging bubbles 22 may begin to undergo deflation and/or degradation. Further, in some embodiments, some of the packaging bubbles 22 may deflate for a pre-set period of time, and afterwards such packaging bubbles 22 may begin to inflate or expand.

The programming of the inflation/deflation of the packaging bubbles 22 may be caused by an intended fit of the packaging 20 over one or more articles, or may be caused by a desire to degrade the packaging 20 at a certain rate, after it is expected that a consumer no longer requires the packaging to retain its current form. Many considerations may be taken into account to determine when and how the packaging bubbles 22 are to deform, a number of which are listed herein. In some embodiments, an initial volume of the bubbles 22 is predefined in light of a desired rate of biodegradation. In some embodiments, a desired quantity of the first element 40 and/or second element 42 is added to the packaging based on an intended amount of degradation of the packaging 20. In that sense, the amount of degradation of the packaging 20 may be altered by multiple, pre-defined factors, so an initial volume of the packaging bubbles 22 may be customized in light of the article(s) intended to be placed into the packaging 20.

Figure 3A:
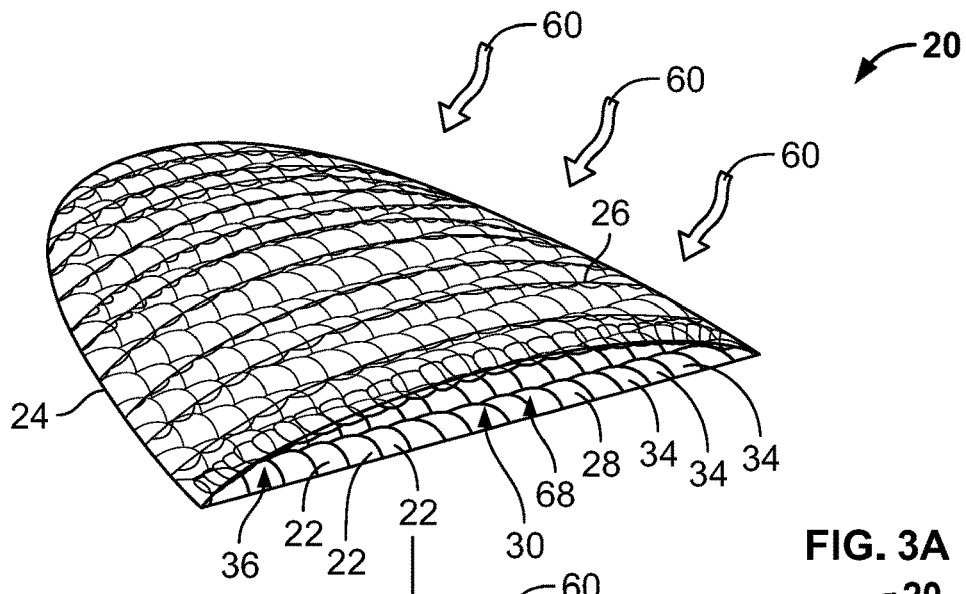
FIG. 3A is a perspective view of the biodegradable packaging of FIG. 1 shown in a first configuration.
Figure 3B:
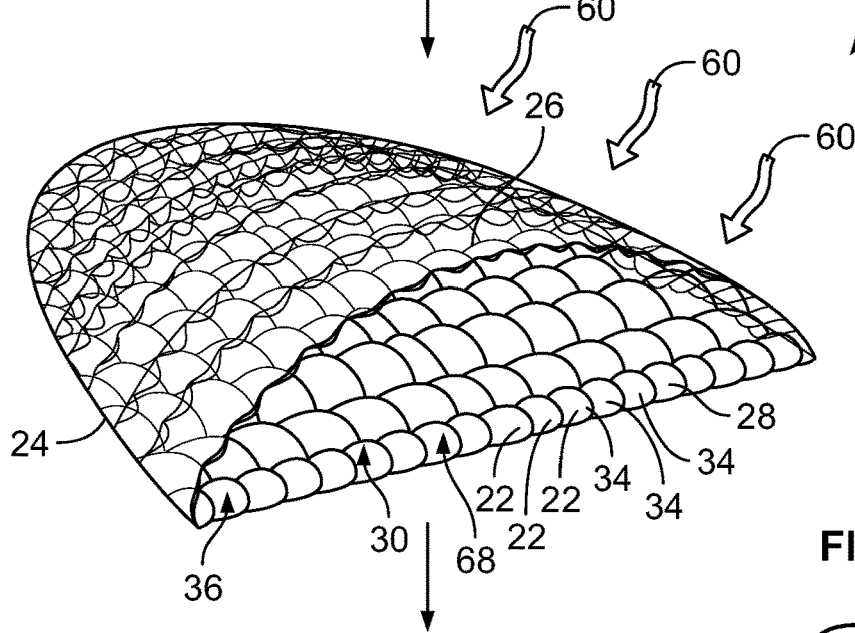
FIG. 3B is a perspective view of the biodegradable packaging of FIG. 1 shown in a second configuration.
Figure 3C:
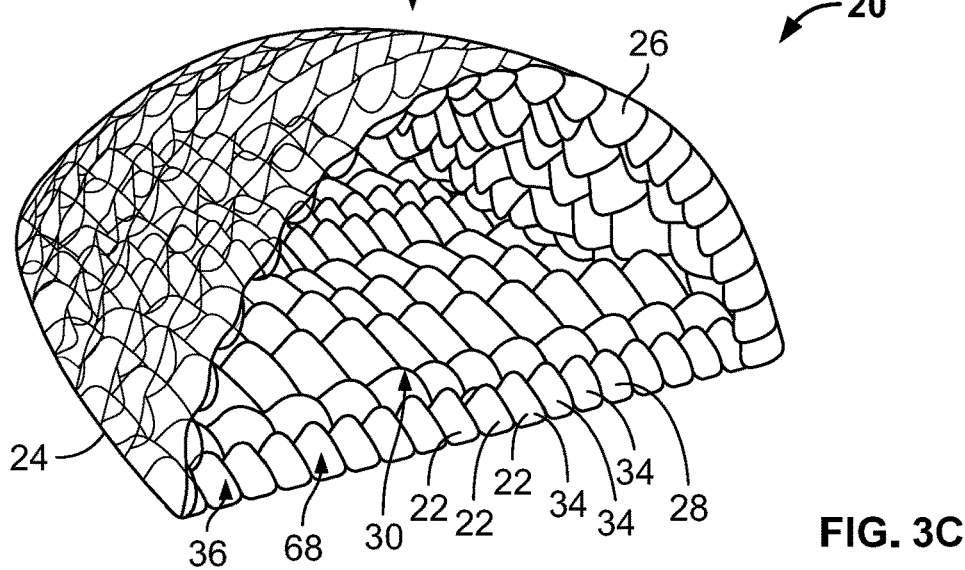
FIG. 3C is a perspective view of the biodegradable packaging of FIG. 1 shown in a third configuration.

Now turning to FIGS. 3A-3C, perspective views of the packaging 20 are shown in a first configuration, a second configuration, and a third configuration, respectively. Referring specifically to FIG. 3A, the packaging 20 is shown in a first configuration. In the first configuration, the bubbles 22 along the top layer 26 and the bottom layer 28 of the packaging 20 are in an initial or null state, wherein the bubbles 22 are generally deflated. The disposition of the bubbles 22 in the initial state allows the packaging 20 to be efficiently and economically stored prior to use as packaging to store or transport one or more articles. As shown in FIG. 3A, in the initial state the packaging 20 is subjected to heat, microwaves, or another external stimulant 60 from a source (not shown), which causes the first element 40, the second element 42, and/or the packaging 20 itself to begin to transition into a second configuration, as shown in FIG. 3B. The stimulant 60 causes the packaging 20 to inflate or expand, and in some embodiments, further causes the first element 40 and/or the second element 42 to be activated. As a result, in the first configuration, the packaging 20 is activated into an in-use state. However, it should be noted that in some embodiments, the stimulant 60 is not needed to inflate or expand, rather, the packaging 20 is in an inflated state immediately after manufacturing.

Referring now to FIG. 3B, the packaging 20 is shown in a second configuration. In the second configuration, the bubbles 22 along the top layer 26 and the bottom layer 28 of the packaging 20 are in a second or partially expanded state, wherein the bubbles 22 are partially inflated. In some embodiments, the volume of expansion of the bubbles 22 is inversely proportional to a size of the article(s) to be encapsulated within the packaging 20. The second state of the bubbles 22 is an intermediate step between the null state and a fully inflated state of the packaging 20. In the partially expanded state, the bubbles 22 are being expanded and the first element 40 and/or second element 42 within the interior cavities 36 thereof are being activated by the stimulant 60 from the external stimulant source (not shown). In the second configuration, the first element 40 and/or the second element 42 may be either partially or fully activated. In some embodiments, the stimulant source may not cause activation of the first element 40 and/or the second element 42; rather, the first element 40 and/or second element 42 may be activated after a certain amount of time has elapsed. In some embodiments, the first element 40 is activated by a first stimulant, and the second element 42 is activated by a second stimulant, different than the first stimulant. In some embodiments, the first stimulant may be applied at a first time, and the second stimulant may be applied at a second time, different than the first time.

Referring now to FIG. 3C, the packaging 20 is shown in a third configuration. In the third configuration, the bubbles 22 along the top layer 26 and the bottom layer 28 of the packaging 20 are in a third or fully expanded state, wherein the bubbles 22 are fully inflated. In some embodiments, the third state of the bubbles 22 is a final step of initial inflation. In the fully expanded state, the bubbles 22 are expanded, and the first element 40 and/or the second element 42 within the interior cavities 36 are fully activated. In some embodiments, the stimulant 60 is not applied once the packaging 20 has achieved the third state. In some embodiments, the stimulant 60 is no longer needed in the fully expanded state since the first element 40 and/or the second element 42 may be fully activated at this juncture. In some embodiments, the stimulant 60 is continually applied to the packaging 20, for example, if the stimulant 60 is ambient air.

As shown in FIG. 3C, the bubbles 22 are of varying initial sizes and have varying internal volumes, which may be due to size or volume considerations of the articles that are intended to be carried by the packaging. It should be noted that once the packaging 20 has achieved the third state of FIG. 3C, the first element 40 and/or the second element 42 may begin the process of inflating or deflating one or more of the bubbles 22, based on a pre-set, programmed, or intended amount of inflation/deflation. Further, in the third state, some of the bubbles 22 may be inflated to a greater degree than other bubbles 22, which may be a result of a varying thickness or consistency of the packaging material. Referring again to FIGS. 2E and 2F, additional embodiments are depicted where the first bubble 44 and the second bubble 46 have outer shells 34 that have a greater thickness than the outer shells 34 of the embodiments of 2A, 2B, 2C, and 2D. Varying levels of inflation may be required in embodiments having bubbles 22 with outer shells 34 that are thicker than the outer shells 34 of the other bubbles 22.

Figure 4:
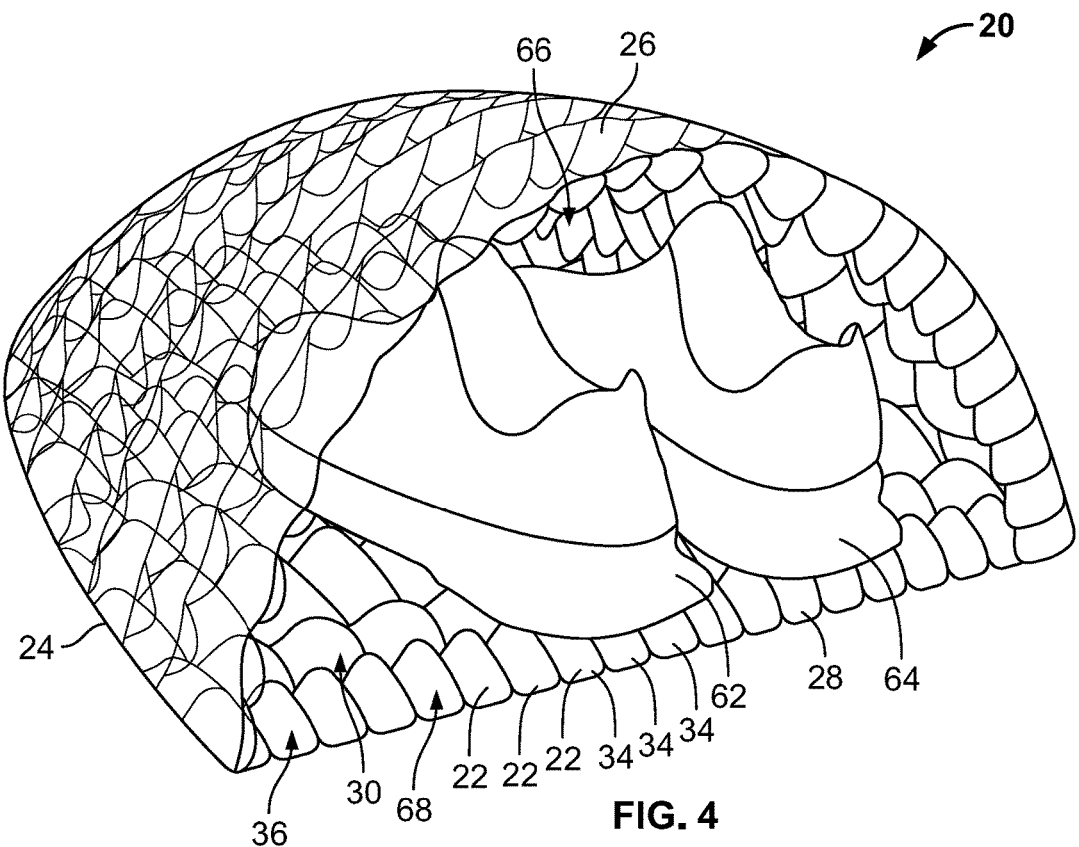
FIG. 4 is a perspective view of the biodegradable packaging of FIG. 1 shown in the third configuration and holding a pair of shoes or articles of footwear.

Referring now to FIG. 4 a perspective view of the biodegradable packaging 20 is shown in the third state (of FIG. 3C) and holding a first or left article of footwear 62 and a second or right article of footwear 64. The first article of footwear 62 and the second article of footwear 64 combine to form a pair of shoes 66. The packaging of FIG. 4 generally depicts the packaging 20 immediately after an article, in this case a pair of shoes 66, has been placed into the void 30 created between the top layer 26 and the bottom layer 28 of the packaging 20. The packaging 20 may be generally conformed to the outer contours of the pair of shoes 66, and may be further formed around the pair of shoes 66, once the first element 40 and/or the second element 42 have begun to cause the bubbles 22 to inflate or deflate, as described above with respect to FIGS. 2A and 2B. In some embodiments, some of the bubbles 22 may begin to immediately degrade in a noticeable manner after the pair of shoes 66 has been inserted into the packaging 20. In some embodiments, some or all of the bubbles 22 inflate to a pre-determined point. In some embodiments, some or all of the bubbles 22 inflate until the bubbles 22 hit a surface along the pair of shoes 66 that prevents further expansion of the bubbles 22. Simultaneously, the bubbles 22 could be degrading in an unnoticeable manner such that at some point, the packaging 20 eventually becomes deflated. Further, in this embodiment, the packaging 20 will eventually be completely degraded by the first element 40 or the second element 42.

Figure 5:
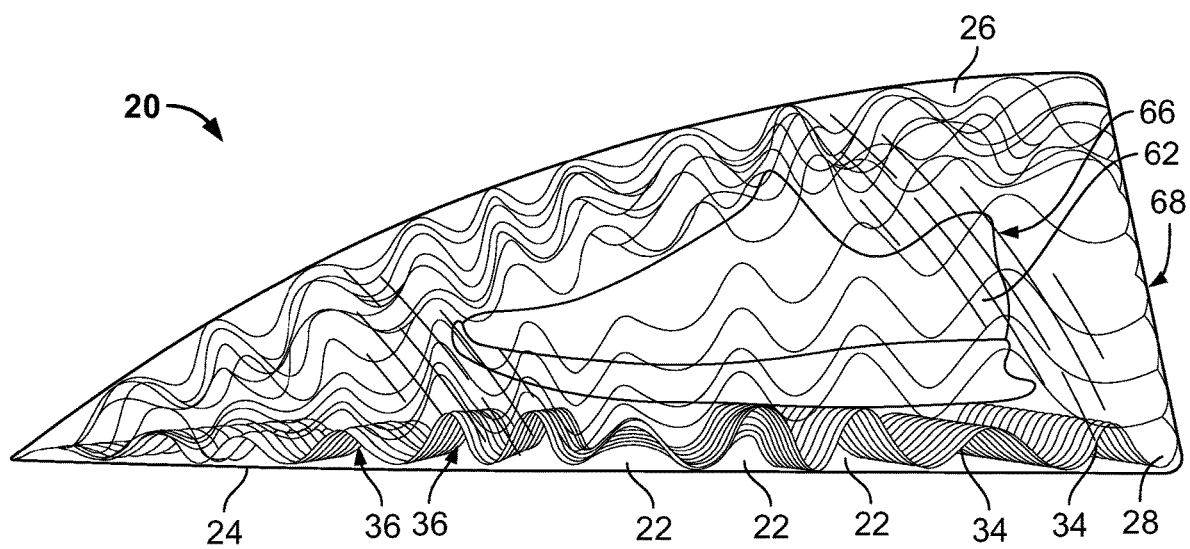
FIG. 5 is a side view of the biodegradable packaging and article of footwear of FIG. 4 in the third configuration and a non-activated state.

Referring to FIG. 5, a side view is shown of the biodegradable packaging 20 and shoes 66 of FIG. 4 in a first or non-degraded configuration. FIG. 5 provides a side view of the packaging 20 and the shoes of FIG. 4, so as to provide context regarding the initial state of the packaging 20 before the first element 40 and/or the second element 42 have caused deformation of the bubbles 22. In some embodiments, the shoes 66 or other articles may be placed into the packaging 20 before the stimulant 60 is applied to the packaging 20, which, when applied, activates portions of the packaging. In some embodiments, the packaging 20 need not be activated by the stimulant source, but may instead come in activated form, or may be activated once removed from a sealed container.

Figure 6:
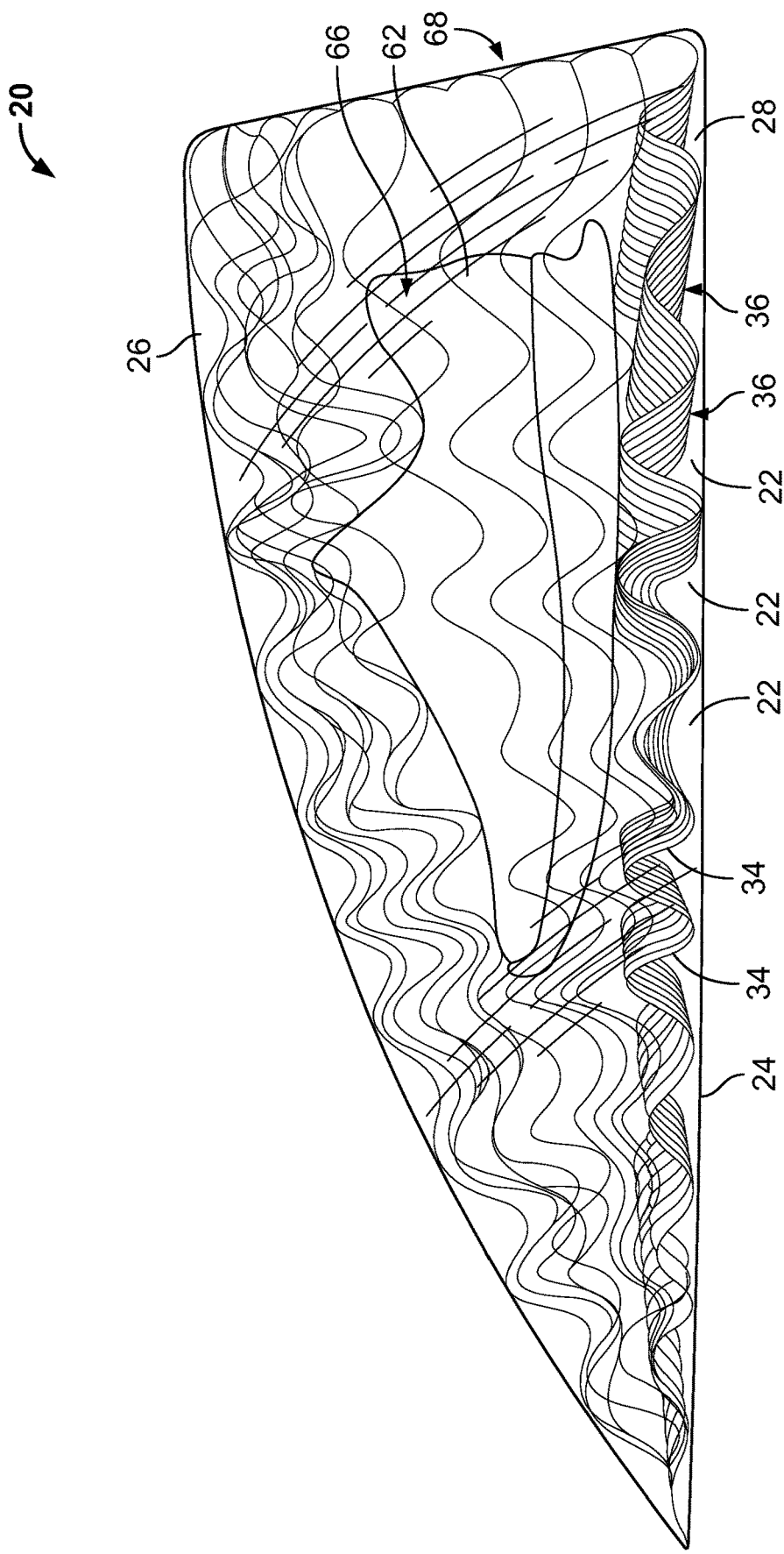
FIG. 6 is a side view of the biodegradable packaging and article of footwear of FIG. 4 in the third configuration and an activated state.

Now turning to FIG. 6, a side view of the biodegradable packaging 20 and shoes 66 are shown in a degraded configuration. The degraded configuration may be a partially degraded, or a fully degraded configuration. As noted above, any number of factors may contribute to the level of degradation achieved in a degraded configuration. In some embodiments, the packaging 20 is biologically programmed to degrade at a certain rate in a certain configuration around the shoes 66 so that during transport and/or storage of the shoes 66, the packaging 20 achieves an efficient configuration secured around the shoes 66. Still further, in some embodiments, additional packaging may be provided within the void 30 of the packaging 20, or may be provided around or about the packaging 20.

Figure 7:
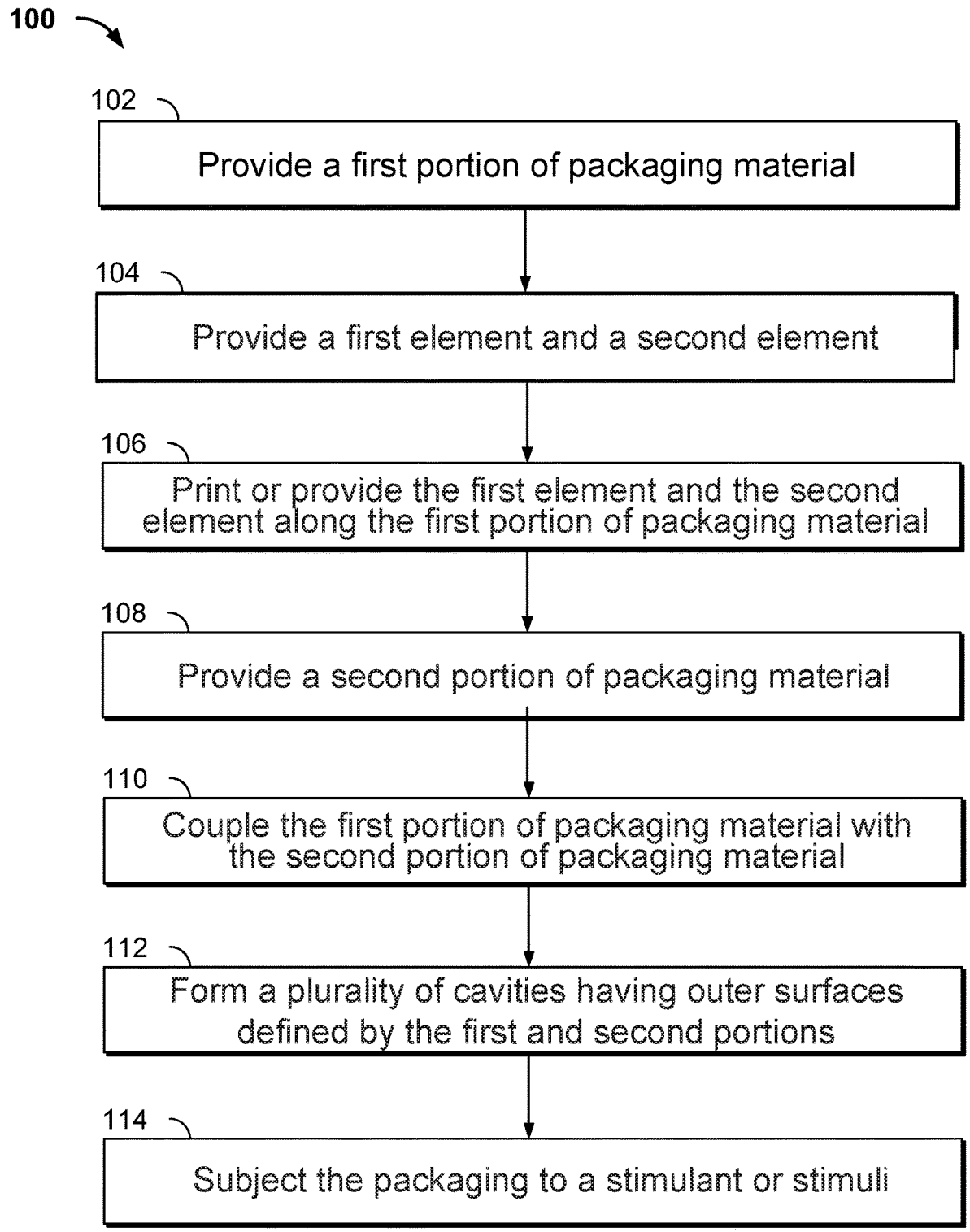
FIG. 7 is a flow chart that depicts a method of manufacturing packaging.

Referring to FIG. 7, a flow chart that includes a method 100 of manufacturing the packaging 20 as disclosed herein is shown. At a step 102, method 100 includes providing a first portion of material, which may be a packaging material. At step 104, the method 100 includes providing a first element and a second element, which may be the same as, or similar to, the first element 40 and the second element 42, as noted above. At step 106, the method 100 includes the step of providing or printing the first element 40 and the second element 42 on the first portion of the material. At step 108, the method 100 includes the step of providing a second portion of the material. At step 110, the method 100 includes the step of coupling the first portion of packaging material with the second portion of packaging material and forming a plurality of cavities having outer surfaces that are defined by the first portion of packaging material and the second portion of packaging material. Once the plurality of cavities are formed, the first element and the second element are disposed within the plurality of cavities, as discussed above with respect to FIGS. 1-6. Finally, at an optional step 114, the packaging is subjected to a stimulant or stimuli, as discussed above, which may cause the first element and/or the second element to begin a process that may inflate or deflate bubbles formed in the packaging. Additional steps may be provided, and the steps as listed above need not be performed in that order. Still further, one or more of the steps may be removed.

Numerous modifications to the present invention will be apparent to those skilled in the art in view of the foregoing description. Accordingly, this description, and the aforementioned examples, are to be construed as illustrative only and are presented for the purpose of enabling those skilled in the art to make and use embodiments of the present disclosure, and to teach the best mode of carrying out same.

As noted previously, it will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

INDUSTRIAL APPLICABILITY

Numerous modifications to the present invention will be apparent to those skilled in the art in view of the foregoing description. Accordingly, this description is to be construed as illustrative only and is presented for the purpose of enabling those skilled in the art to make and use the invention and to teach the best mode of carrying out same. The exclusive rights to all modifications which come within the scope of the appended claims are reserved.

We claim:

1. Packaging, comprising:
   a first layer of bubbles, wherein each of the bubbles comprises an outer shell that defines an interior cavity that is airtight; and
   a first element and a second element, which is different from the first element, provided within the interior cavity of at least one bubble, wherein the first element is yeast and the second element includes bacteria, and
   wherein the at least one bubble is configured to inflate or degrade over time.

2. The packaging of claim 1, wherein the outer shell of the at least one bubble including the first element and the second element comprises a biodegradable material.

3. The packaging of claim 2, wherein all of the bubbles of the first layer include the first element and the second element in their respective cavities.

4. The packaging of claim 1, wherein the first element and the second element are not activated during a first state, and
   wherein the first element and the second element are activated during a second state.

5. Packaging, comprising:
   a first layer and a second layer of bubbles, wherein each of the bubbles comprises an outer shell that defines an interior cavity that is airtight, the first layer and the second layer being connected along an edge,
   wherein at least one bubble of the first layer of bubbles includes a first element and a second element within the interior cavity, wherein the first element is yeast and the second element includes bacteria,
   wherein at least one bubble of the second layer of bubbles includes the first element and the second element within the interior cavity, and
   wherein the at least one bubbles of the first and second layers are configured to inflate or degrade over time.

6. The packaging of claim 5, wherein the outer shells of the at least one bubble including the first element and the second element in the first and second layers comprises a biodegradable material.

7. The packaging of claim 6, wherein all of the bubbles of the first layer and second layer include the first element and the second element in their respective cavities.

8. The packaging of claim 5, wherein a void is formed between the first layer of bubbles and the second layer of bubbles.

9. The packaging of claim 8, wherein the void is configured to hold a pair of shoes.

10. The packaging of claim 5, wherein the first plurality of bubbles are configured to inflate and the second plurality of bubbles are configured to deflate after being subjected to a stimulant.

* * * * *